Patented Feb. 23, 1937

2,071,395

UNITED STATES PATENT OFFICE 2,071,395

MANUFACTURE OF POLYHYDRIC ALCOHOLS

Henry Dreyfus, London, England

No Drawing. Application July 1, 1932, Serial No. 620,546. In Great Britain August 4, 1931

4 Claims. (Cl. 260—156.5)

This invention relates to the manufacture of polyhydric alcohols from olefines, and particularly the manufacture of glycol from ethylene.

According to the invention it has been found that polyhydric alcohols may readily be obtained by subjecting olefines to oxidation with oxygen in presence of water, and in particular that glycol can be obtained in a very satisfactory manner by subjecting ethylene to oxidation with oxygen in presence of water.

For the purpose of the invention the oxygen may be employed alone or in admixture with indifferent gases, for example nitrogen. Catalysts or oxygen carriers (or substances capable of producing them) assist the reaction.

The oxidation may be performed in any convenient manner. Thus for instance the olefine in admixture with steam and with oxygen, air or the like may be heated in presence of oxidizing catalysts for instance copper, copper oxide or vanadium pentoxide. Preferably the catalysts are themselves or comprise hydrating catalysts, such for instance as phosphoric acid, tungstic oxide, alumina, zinc chloride or the like. The reaction may advantageously be performed at temperatures between about 200 and 500° C. though it is to be understood that I in nowise limit myself to the use of such temperatures. The mixtures employed preferably contain substantial quantities of oxygen, air or the like, such for instance as between about 1 and 3 volumes of actual oxygen relatively to each 4 volumes of olefine present, and, moreover, preferably contain large or relatively large quantities of steam such for instance as 1 to 5 volumes of steam relatively to each volume of olefine. The mixture of oxygen, steam and olefine may be subjected to reaction at reduced, normal or increased pressure.

Preferably, however, the ethylene or other olefine is oxidized by means of oxygen in presence of liquid water. As examples of bodies which may be used to assist the process in such a method of operation and these bodies will be termed "oxygen carriers" hereinafter in the specification and claims may be mentioned manganese compounds or iron salts with or without iodine, e. g. manganates or manganese salts such as manganous or manganic acetate, ferrous sulphate or other ferrous salts, iodine itself and persalts, such for instance as perborates, persulphates, permanganates, perchromates, perchlorates and the like of the alkali or other metals. Mixtures of two or more of such bodies, and which hereinafter are referred to as oxygen carriers, may be employed.

The liquid medium employed when the oxidation is performed in the liquid phase may be acid, alkaline or neutral in reaction. The catalysts or oxygen carriers may be employed in any form e. g. in solution or in suspension and in any desired proportion to the water. For instance the olefine and air may be passed into or through dilute or relatively dilute aqueous solutions of the oxygen carriers or catalysts, such for instance as solutions of about 1 to 10% strength or even more concentrated solutions. If desired water may be added to the solutions during the progress of the reaction in order to replace water used up in the reaction, thereby enabling the reaction to continue under substantially uniform conditions of concentration and enabling increased quantities of polyhydric alcohol to be produced in the same reaction liquor. The reaction may be performed at ordinary or raised temperatures, including temperatures up to the boiling point of the reaction liquor and at any desired pressure; it is, however, preferable to employ super-atmospheric pressure. Preferably I employ mixtures of olefine and oxygen, air or the like containing substantial proportions of oxygen, and especially mixtures containing between about 1 and 3 or more volumes of actual oxygen for each 4 volumes of olefine.

What I claim and desire to secure by Letters Patent is:—

1. Process for the manufacture of polyhydric alcohols which comprises producing said polyhydric alcohols by subjecting normally gaseous olefines to catalytic oxidation by means of oxygen in presence of liquid water maintained near its boiling point under the pressure obtaining and containing oxygen carriers.

2. Process for the manufacture of ethylene glycol which comprises producing said ethylene glycol by subjecting ethylene to catalytic oxidation by means of oxygen in presence of liquid water maintained near its boiling point under the pressure obtaining and containing oxygen carriers.

3. Process for the manufacture of ethylene glycol, which comprises producing said ethylene glycol by subjecting ethylene to catalytic oxidation by means of oxygen in presence of liquid water maintained near its boiling point under the pressure obtaining, and containing a manganese compound.

4. Process for the manufacture of ethylene glycol, which comprises producing said ethylene glycol by subjecting ethylene to catalytic oxidation by means of oxygen in presence of liquid water maintained near its boiling point under the pressure obtaining, and containing an iron salt.

HENRY DREYFUS.